United States Patent [19]

Blankenburg et al.

[11] 4,216,624
[45] Aug. 12, 1980

[54] WINDOW WINDER FOR SLIDABLE WINDOWS, ESPECIALLY FOR AUTOMOBILES

[75] Inventors: Heinz Blankenburg, Frankfurt am Main; Peter Schafer, Bruchköbel; Friedrich Herrmann, Maintal, all of Fed. Rep. of Germany

[73] Assignee: Rockwell-Golde, G.m.b.H., Frankfurt, Fed. Rep. of Germany

[21] Appl. No.: 19,523

[22] Filed: Mar. 12, 1979

[30] Foreign Application Priority Data

Mar. 21, 1978 [DE] Fed. Rep. of Germany ....... 2812314

[51] Int. Cl.² ............................................. F16H 27/02
[52] U.S. Cl. ..................................... 49/352; 74/89.2; 74/606 R; 74/411.5
[58] Field of Search ........................ 49/348, 349, 352; 74/89.2, 89.21, 606 R

[56] References Cited

U.S. PATENT DOCUMENTS

| | | | |
|---|---|---|---|
| 3,280,509 | 10/1966 | Werner | 49/352 |
| 3,469,128 | 9/1969 | Cartier | 49/349 X |
| 3,681,874 | 8/1972 | Golde et al. | 74/89.2 X |
| 3,735,645 | 5/1973 | Pickles | 74/606 |

FOREIGN PATENT DOCUMENTS 2753671 7/1978 Fed. Rep. of Germany .............. 49/352

*Primary Examiner*—Kenneth Downey

[57] ABSTRACT

The window winder for a slidable window, especially a window capable of being lowered into the window shaft of an automobile, has a threaded cable displaceably guided in a tension resistant and compression resistant manner in a guide tube. The threaded cable engages, in a two part drive casing, a drive pinion which is non-rotatably keyed to a drive shaft journalled in the two half casing of a gear wheel drive equipped with a drag spring brake. The threaded cable is directly or indirectly connected to the window by one or more entraining devices fixed to the cable and penetrating through a longitudinal slit in the guide tube. The guide tube is a slit metal tube in the region of the path of movement of the entraining devices and elsewhere is a plastic tube connected to the drive casing and the metal tube in a non-displacing, non-rotatable manner by means of sleeves injection molded onto the plastic tube. The two parts of the drive casing are injection molded from plastic material and their parting plane is situated outside the threaded cable passing through the casing and outside the drive pinion between the drive pinion and the drag spring barke. The guide duct guides the threaded cable substantially in alignment with the internal surface of the guide tube and open towards the drive pinion and the parting plane is disposed in one casing part and the sleeves which receive the guide tube are formed integrally with the casing part.

8 Claims, 7 Drawing Figures

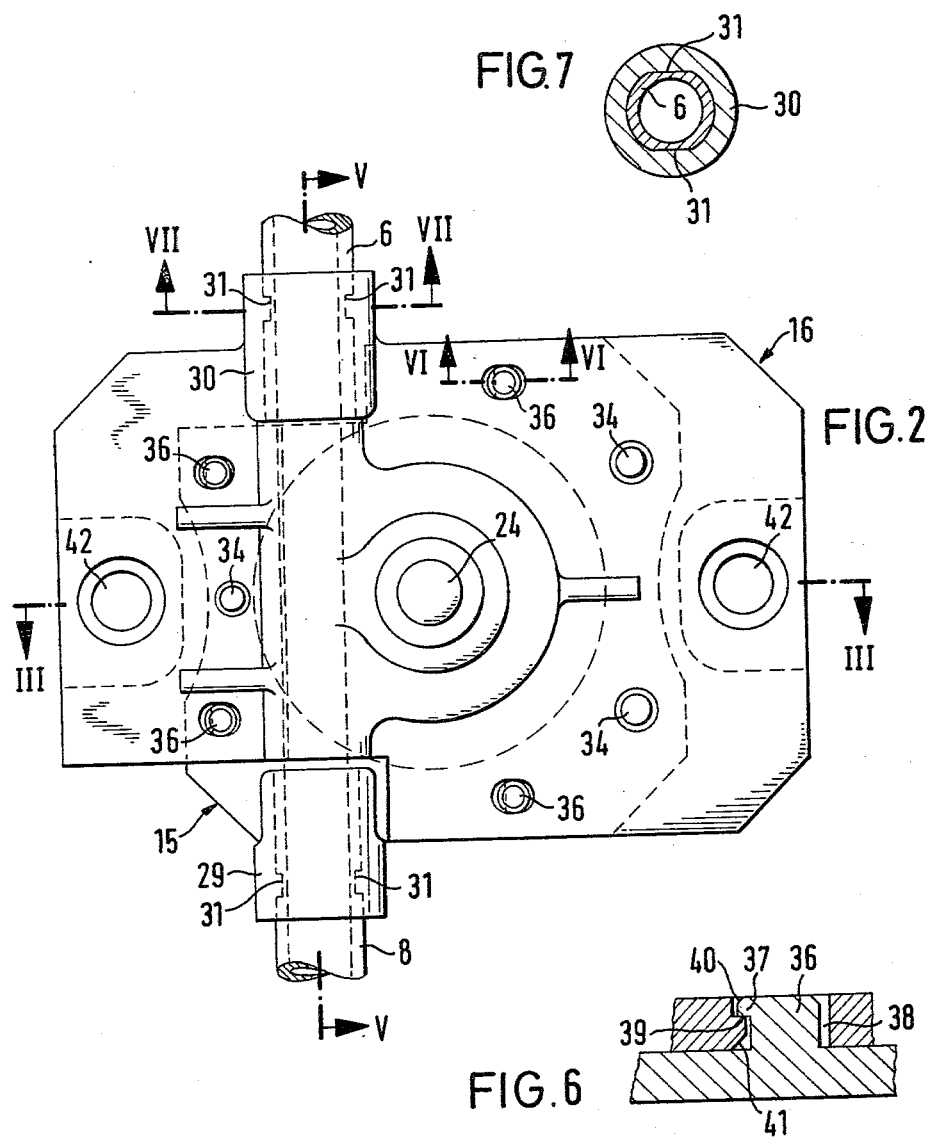

WINDOW WINDER FOR SLIDABLE WINDOWS, ESPECIALLY FOR AUTOMOBILES

BACKGROUND OF THE INVENTION

This invention relates to a window winder for a slidable window, especially a window which can be lowered into the window shaft of an automobile, comprising a threaded cable displaceable in tension-resistant and compression-resistant manner in a guide tube, with which cable there is in engagement, in a two-part drive casing, the drive pinion non-rotatably keyed to a drive shaft journalled in the two casing halves of a gear wheel drive equipped with a drag spring brake, and which cable is directly or indirectly connected to the window by one or more entraining devices secured to the threaded cable and penetrating through a longitudinal slit in the guide tube, wherein the guide tube is a slit metal tube only approximately in the region of the path of movement of the entraining devices and elsewhere is a plastics tube connected non-rotatably and non-displaceably to the drive casing and metal tube by means of sleeves injection moulded onto the plastics tube.

In a known window winder of this type of construction (DE-PS No. 19 31 472), in which the plastics tube is manufactured from a relatively stiff plastics material bent if necessary using heat into the predetermined bending radii, such as copolymerized polyacetals, the plastics tube is conducted through the drive casing and is furnished at the position of its passage with an aperture for the penetration of the drive pinion. The drive casing here consists as usual (DE-PS No. 11 98 239) of two sheet steel components, which surround the tube passing through the casing with a tube profile half formed in each of these two parts and are riveted together. The sheet steel casing is secured against axial displacement by two sleeves injection moulded onto the plastics tube on either side of the integrally formed tube profile, additional closely fitting clamping devices between the sleeves and the drive casing securing against rotation. The aperture for the passing of the drive pinion is, in this known window winder, milled in the shape of a circular arc into the plastics tube to suit the external diameter of the pinion.

This known window winder is indeed functionally reliable, but its economic manufacture presents considerable difficulties. Thus, the injecting around of the plastics tube with two sleeves, the distance of which from one another must equal the width of the drive casing within close tolerances, has proved extremely difficult. In addition, excess injected material on the sleeves must be removed by hand in a time-consuming manner before the tube is placed in. The arc-shaped, milled aperture not only leads to a considerable weakening of the tube cross-section in this region but also necessitates subsequent deburring by hand. A very substantial disadvantage of the known window winder results from the variation within wide tolerances of the wall thickness of the plastics tube, which has a very adverse effect in the region of the pinion penetration upon the axial distance between pinion and threaded cable which must be maintained in the interest of optimum tooth engagement between pinion and threaded cable.

The task underlying the present invention is, while avoiding the aforementioned disadvantages, to propose a window winder which can be manufactured economically to accurate dimensions, and which in particular does not need to be finished by hand at the state points, and which permits an exact maintaining of the axial distance between the drive pinion and threaded cable.

Starting from a window winder of the category initially named, the invention solves this task by the fact that the two parts of the drive casing are injection moulded from plastics material and that their parting plane is situated outside the threaded cable passing through the casing and outside the drive pinion between the drive pinion and the drag spring brake, a guide duct guiding the threaded cable and substantially aligned with the inner surface of the guide tube and open towards the drive pinion and towards the parting plane being disposed in one part of the casing, and by the fact that, of the sleeves situated on the casing, each is formed on and therefore formed in one piece with one casing part.

In the window winder constructed according to this invention, the plastics tube is no longer conducted through the casing, so that not only the milling of an aperture in the plastics tube for passage of the pinion is eliminated, but also fluctuations in the wall thickness of the plastics tube do not have any influence upon the axial spacing between pinion and threaded cable. The aforementioned axial distance is always exactly maintained by the defined position of the guided duct in the one casing part predetermined by the injection mould. The aforementioned special position of the dividing plane of the casing ensures that the two casing parts are not forced apart by the pressure acting on the cable due to engagement of the teeth. The forces acting transversely upon the cable are directly accepted by the guide duct wall, which is substantially curved in correspondence with the internal surface of the adjoined guide tube, without casing deformations arising and without the ends of the casing parts being loaded. Since the guide duct extends across the full width of the drive casing, a sufficiently large bearing surface is also available to the cable in the drive casing, so that there is no risk of premature wear. The favourable coefficient of friction between the material of the cable and the plastics casing moreover leads to especially easy running in the vicinity of the drive. The injection moulding of the casing parts moreover offers the advantage that the sleeves which form the connection to the plastics tube can be formed in one piece with the casing parts, so that requirements for subsequent finishing in the region of the sleeves are completely eliminated. The distance between the sleeves determined by the injection mould is no longer decisive for the fitting of the casing to the plastics tube, because the plastics tube is no longer conducted through the casing.

The arrangement is preferably such that the parting plane through the drive casing is approxiamtely tangential to the external periphery of the threaded cable, and that the guide duct is formed back-cut relative to the parting plane. By the back-cut, the bearing and guide surface of the duct guiding the threaded cable is still further increased. In addition, the region of the guide duct resulting from the back-cut takes account of the circumstance that the compression forces exerted by the guide pinion upon the threaded cable acts not only tangentially but also, due to the helical shape of the winding on the threaded cable, cause a component of force transversely to the parting plane of the casing. This component of force is accepted by the region of the duct formed by the back-cut without any effect upon the holding-together of the two fixed together parts of the casing.

The part of the casing opposite to the guide duct for the threaded cable is equipped with a pot-like formation for housing the drag spring brake typical of this drive system. Here, the drag spring can bear directly against an inner cylindrical wall surface of the pot-like formation. It has been found that, in spite of the frictional pair between the steel of the drag spring and the plastics of the casing, an absolutely sufficient brake action is achieved against the reverse forces introduced by the threaded cable. To prevent the turns of the drag spring from penetrating into the plastics cylinder wall, the arrangement may with advantage be such that a metal cylinder surrounding the drag spring is pressed in or moulded in to the part of the casing which houses the drag spring, coaxially to the drive shaft.

In order to attain exact alignment between the two parts of the casing in respect of the bearing positions for the drive shaft and of the sleeves opposite to the casing, it is of advantage of centering pins or the like are moulded onto one casing part at the parting plane and perpendicularly thereto, depressions in the opposite casing part corresponding to these pins.

The two parts of the casing can be firmly connected together by conventional detachable or permanent connecting elements, for example by screws or rivets. A substantial saving in time in assembly of the casing can , however, be achieved if, for the purpose of connecting the two casing parts together, connecting elements which engage with and interlock with one another on assembly are intergrally formed on the two housing parts. Such connecting elements come automatically in operation when the two parts of the casing are pressed together guided by the centering pins.

The two casing parts, the plastics tube and the sleeve provided for the connection to the slit metal tube can be made from the same stiff thermoplastics material, preferably from polyacetal. The plastics tube attached to the casing as the outlet tube for the free end of the threaded cable may, by contrast, be made from hard polyethylene, because due to the flexibility of this material automatic adapting of the outlet tube to the existing internal space of the window shaft is rendered possible. An elastically flexible plastics tube can with advantage be provided also between the slit metal tube and the drive casing. Such an elastically flexible plastics tube offers the advantage that the window winder does not have to be adapted from the start by a suitably curved guide tube to the installation situation in the automobile. When an elastically flexible plastics tube is used, this tube can remain in the straight position during manufacture, storage and transporting and does not need to be bent until installation in the automobile. Such a plastics tube is capable also of taking up considerable dimensional deviations at the place of installation. For an elastically flexible plastics tube, suitable materials in particular are polyamide 12 and polytetramethylene terephthalate. These plastics materials on the one hand are sufficiently flexible when formed into tubes, but on the other hand possess sufficient stability of shape for the guide tube formed from them not to become deformed when the window winder is operated as a result of the forces transmitted by the threaded cable.

In order to provide a firm anchorage for the plastics tube to the drive casing, it is advantageous if the ends of the plastics tube, which are injected around with sleeves during the injection moulding of the casing parts and which adjoin the casing parts, are mechanically connected to the casing in known manner by transverse milled recesses at the outer periphery of the plastics tube and/or holes through this tube.

In order to achieve an exact guiding of the threaded cable in the guide duct in the region of the pinion, the arrangement is with advantage such that the guide duct is reduced in radius in the region of the drive pinion to the external diameter of the threaded cable.

Further details of the invention are explained in more detail below with reference to the drawings illustrating an example of embodiment thereof.

BRIEF DESCRIPTION OF THE DRAWINGS

FIG. 2 is the drive casing with connected plastics tubes to natural size.

FIG. 6 is a section along VI—VI of FIG. 2 but to a larger scale.

FIG. 7 is a section along VII—VIII of FIG. 2.

DETAILED DESCRIPTION OF THE PREFERRED EMBODIMENT

Figure 1:
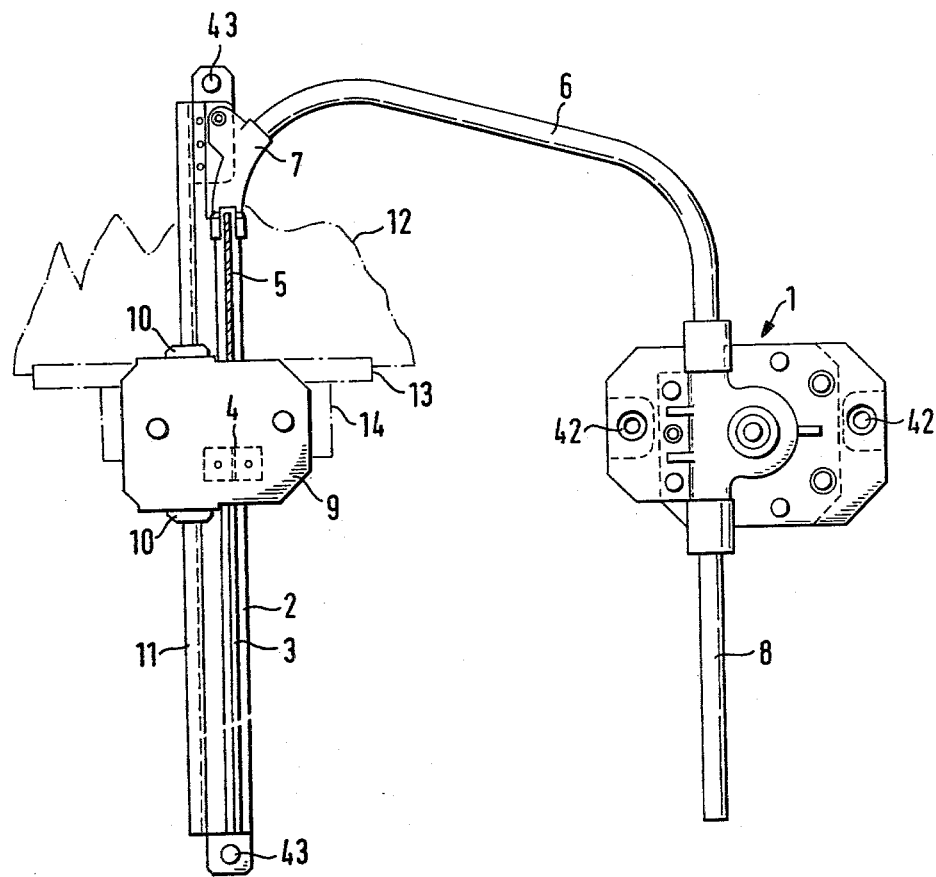
FIG. 1 is a side view of a complete window winder, shown in its installed position.

The essential parts of the window winder shown in FIG. 1 are the drive casing 1 to be described in more detail, the metal tube 2 with longitudinal slits 3 for passage of the entraining device 4, the threaded cable 5, the plastics tube 6 connecting the metal tube 2 to the drive casing 1, the sleeve 7 injection moulded onto the plastics tube 6 and serving as connecting member between plastics tube 6 and metal tube 2, and the plastics tube 8, connected to the casing 1 and receiving the free end of the threaded cable 5.

The conventionally constructed entraining device 4, which is fixed to the end of the threaded cable 5 guided in the metal tube 2, is connected to a carrier plate 9, which is guided by two slide elements 10 fixed to it on a central guide bar 11, to provide the sole or additional guiding of the window pane in the manner of a slide. The window pane 12, shown only partly and in broken line, is connected to the carrier plate 9 by the support bar 13 and lifting strap 14.

The metal tube 2 is fixed to the guide bar 11 parallel to the guide paths of the guide bar.

The central guide consisting of the parts 9, 10 and 11 is itself known and therefore does not require further explanation here, since it is not a necessary component of the invention. It serves essentially for reducing tilting of the window pane about an axis approximately perpendicular to the plane of the pane, where the lateral guiding of the pane 12 is inadequate.

Figure 4:
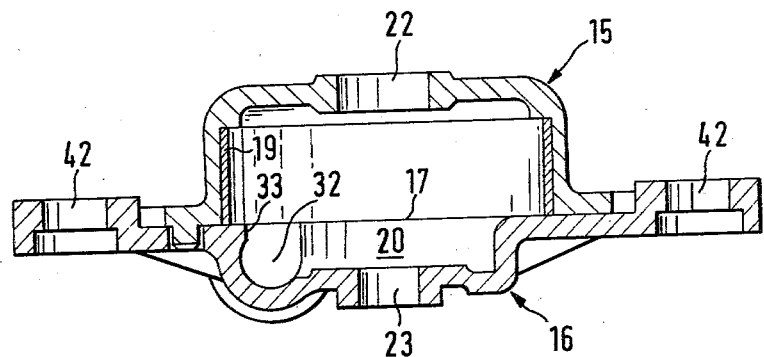
FIG. 4 is a section similar to FIG. 3, but without the parts of the gear wheel drive and the drag spring brake.
Figure 3:
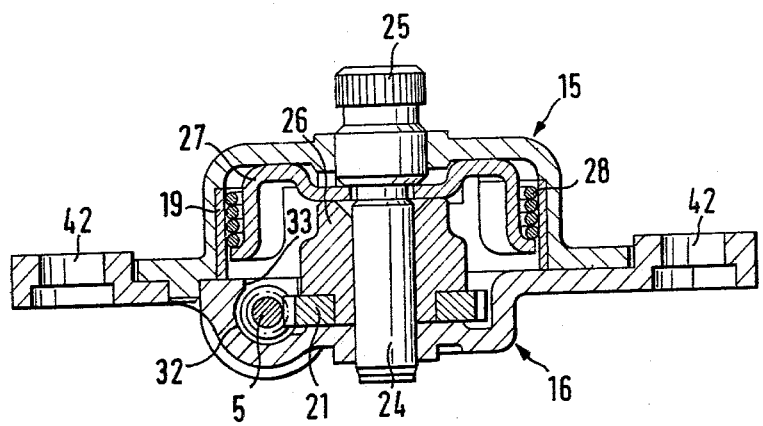
FIG. 3 is a section along III—III of FIG. 2.

To explain the drive casing in more detail reference will now be made to FIGS. 2 to 5. The drive casing 1 consists of the two parts 15 and 16, injection moulded from a suitable plastics material, e.g. polyacetal, the parting plane between them extending basically along the line 17 (FIGS. 3 and 4). The casing part 15 possesses a rotationally symmetrical, pot-shaped formation 18, in which, in the example shown here, a moulded-in or pressed-in metal cylinder 19 is housed. The other casing part 16 possesses a housing space 20 for the drive pinion 21 shown in FIG. 3.

Coaxial with the metal cylinder 19, bearing bores 22 and 23 respectively for the drive shaft 24 are provided in the casing parts 15 and 16. The drive shafts 24, equipped with a toothed or knurled head 25 onto which a hand crank (not shown) may be fitted, is torsionally keyed in a manner not shown here by means of a drive member 26 to the drive pinion 21. The drive shaft 24 is also coupled to a drag member 27, which carries at its outer circumference the drag spring 28, which in co-operation with the metal cylinder 19 or, where the metal cylinder 19 is omitted, with a cylindrical internal wall face of the pot-shaped formation 18, constitutes the drag spring brake. The gear wheel drive with drag spring brake is of itself known and therefore requires no further explanation here for the purpose of the present description of this invention.

Figure 5:
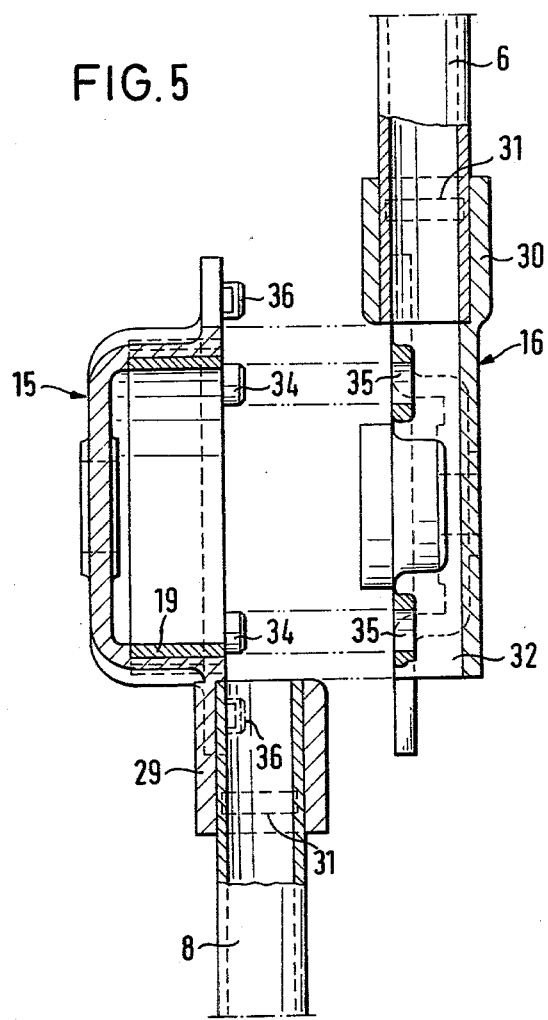
FIG. 5 is a section through the two separated half-casings along V—V of FIG. 2.

As can be seen most clearly from FIG. 5 in conjunction with FIG. 2, each of the casing parts 15 and 16 possesses an integrally formed sleeve 29, 30 respectively, which after assembly of the two casing parts 15 and 16 are coaxially aligned. The sleeves 29 and 30 receive the plastics tubes 8 and 6 respectively, which have been laid in the injection mould and injected around to form the sleeves 29 and 30 and are therefore permanently connected to the respective associated casing parts 15 and 16. To further improve clamping of the plastics tubes 6, 8 to the sleeves 30, 29, the plastics tubes are furnished at their outer circumference with transverse milled recesses arranged in pairs (FIGS. 2, 5 and 7). During injection moulding, plastics material penetrates into these transverse milled recesses, causing the plastics tubes 6 and 8 to be secured against pulling out.

To guide duct 32, for the threaded cable 5 passing through the drive casing 1, which guide duct is open towards the drive pinion 21 and towards the parting plane 17, is moulded in to the casing part 16. As viewed in cross-section (FIG. 4), the guide duct 32 has an arc-shaped curvature extending through a considerable angular range exceeding 180° and extending as a part tube profile across the entire width of the drive casing land adjoining in alignment the internal faces of equal diameter of the plastics tubes 6 and 8. The position of the guide duct 32 in the casing part 16 is so selected for the purpose of relieving the casing from compressive tooth forces of the gear wheel drive that the parting plane 17 of the casing is situated outside the threaded cable 5 passing through the casing and outside the drive pinion 21, but between the drive pinion 21 and the drag spring brake 28.

As can be clearly seen from FIG. 3, the parting plane 17 is approximately tangential to the outer periphery of the threaded cable 5. As a result of the described cross-sectional shape of the guide duct 32 with its arc-shaped curvature extending beyond 180°, a back-cut shown at 33 results, which ensures that the wall of the guide duct 32 can also accept forces oriented perpendicularly to the parting plane 17.

For the purpose of automatically centering the two casing parts 15 and 16 during their assembly, a plurality of centering pins 34 (FIGS. 2, 5) are injection moulded integrally to casing part 15 starting from the parting plane and perpendicularly thereto, which pins co-operate with corresponding centering bores 35 in the other casing part 16. The firm connection between the two casing parts 15 and 16 is provided in the example illustrated here by mutually interlocking connecting elements, consisting respectively of a projection 36 integrally moulded on the casing part 15 and possessing a detent nose 37 and of a recess 38 with detent step 39 integrally moulded in the other casing part 16 (FIG. 6). To facilitate interlocking, the detent nose 37 is equipped with a chamber 40, which co-operates with a corresponding oblique face 41 of the recess 38.

If a comparatively rigid plastics tube 6 is desired, this may be an extruded section of polyacetal, bent to the desired bending radii by the use of heat. The sleeve 7 is with advantage, like the casing parts 15 and 16, injection moulded from polyacetal. A flexible extruded section, for example of rigid polyethylene, is suitable for the plastics tube 8, in order better to accommodate to the installation space available in automobiles. The plastics tube 6, however, can also be formed as an elastically flexible plastics tube, if a material is selected for this purpose which still possesses sufficient stability of form. This is the case, for instance, with polyanide 12 or polytetramethylene terephthalate. A plastics tube 6 flexible elastically within specific limits offers the advantage that it can accommodate considerable installation tolerances in the automobile. Moreover, during storage and transportation, it can adopt a straight position which occupies less space. For difficult installation situations, it can follow practically any desired spatial path.

The window winder according to the present invention, as described with reference to the example of embodiment illustrated according to FIG. 1, permits dividing up into two systems which can be separately manufactured. The one system is consituted of the actual drive elements, consisting of the drive casing 1, the plastics tubes 6 and 8, the threaded cable 5 and the sleeve 7. The other system serves essentially for guiding and consists where applicable of the guide bar 11 with the parts 9, 10 guided thereon and the metal tube 2. During the final assembly of the window winder, the drive system, after the operating cable has been introduced into the metal tube 2 and the sleeve 7 has been placed over the metal tube 2, is combined with the guide system by riveting the sleeve 7 to the guide bar 11. If no guide bar 11 is provided, a metal plate can be fixed to the metal tube 2, the sleeve 7 being riveted to this metal plate. Instead of the use of a sleeve 7 to be riveted on, the plastics tube 6 may be connected to the guide bar 11 and/or to the metal tube 2 by injecting on and around with plastics material.

The window winder and where applicable the guide bar 11 are fixed by means of the fixing bores 42 in the housing component 16 and 43 in the guide bar 11, for example to the internal metal plate of an automobile door. If no guide bar 11 is provided, the metal tube 2 can be furnished with appropriate metal straps, in which fixing bores are formed.

In the example of embodiment illustrated and described here, the metal tube 2, together with the plastics tube 6 connecting to the drive casing 1 is connected to casing component 16, whereas the plastics tube 8 is connected to casing component 15. The arrangement can, of course, be reversed, i.e. the plastics tube 6 can be connected to the casing part 15 and the plastics tube 8 can be injection moulded to the casing part 16.

The metal tube 2 can be profiled from steel or can be extruded from aluminum. It may, however, also be formed from a suitable, for instance, glass-fibre reinforced plastics material.

The guide duct 32 illustrated straight in the drawing for the purpose of simplicity can be reduced in its radius to the external diameter of the threaded cable in the region of the drive pinion 21, i.e. to the external diameter of the helical thread, in order to prevent deflection of the cable when drive forces are applied. In the longitudinal region of the guide duct of reduced radius, the wall of the duct may be cylindrical.

I claim:

1. A window winder for a slidable window, especially a window capable of being lowered into the window shaft of an automobile, comprising a threaded cable displaceably guided in a tension-resistant and compression-resistant manner in a guide tube, with which cable there engages, in a two-part drive casing, the drive pinion non-rotatably keyed to a drive shaft journalled in the two half-casings of a gear wheel drive equipped with a drag spring brake, and which cable is directly or indirectly connected to the window by one or more extraining devices fixed to the threaded cable and penetrating through a longitudinal slit in the guide tube, wherein the guide tube is a slit metal tube only in the region of the path of movement of the entraining devices and elsewhere is a plastics tube connected to the drive casing and the metal tube in a non-displacing, non-rotatable manner by means of sleeves injection moulded onto the plastics tube characterized in that the two parts (15, 16) of the drive casing (1) are injection moulded from plastics material and that their parting plane (17) is situated outside the threaded cable (5) passing through the casing and outside the drive pinion (21), between the drive pinion and the drag spring brake (28), whereby a guide duct (32), guiding the threaded cable and substantially in alignment with the internal surface of the guide tube (6, 8) and open towards the drive pinion and towards the parting plane, is disposed in one casing part (16), and that of the sleeves (29, 30) situated on the casing each is formed on and therefore formed in one piece with one casing part.

2. Window winder according to claim 1, characterized in that the parting plane (17) of the drive casing (1) is approximately tangential to the external periphery of the threaded cable (5) and that the guide duct (32) is formed back-cut (33) from the parting plane.

3. Window winder according to claims 1 or 2, characterized in that a metal cylinder (19) surrounding the drag spring (28) is pressed into or moulded into the casing part (15) containing the drag spring brake, coaxially to the drive shaft (24).

4. Window winder according to one of claims 1 to 3, characterized in that centering pins (34) or the like are moulded on one casing part (15) at the parting plane (17) and perpendicularly thereto, depressions (35) corresponding to these pins being formed in the other casing part (16).

5. Window winder according to one of claims 1 to 4, characterized in that, for the purpose of firmly joining together the two casing parts (15, 16), connecting elements (36 to 41), which engage with and interlock with one another on assembly, are integrally formed on the two casing parts.

6. Window winder according to one of claims 1 to 5, characterized in that an elastically flexible plastics tube (6) is provided.

7. Window winder according to one of claims 1 to 6, characterized in that ends of the plastics tube (6, 8), around which sleeves (29, 30) are moulded during the injection moulding of the casing parts (15, 16), which ends adjoin the casing parts, are mechanically locked to the casing in known manner by transverse milled recesses (31) at the external circumference and/or by holes through the plastics tube.

8. Window winder according to one of claims 1 to 7, characterized in that the guide duct (32) is reduced in the region of the drive pinion (21) in its radius to the external diameter of the threaded cable (5).

* * * * *

UNITED STATES PATENT AND TRADEMARK OFFICE
CERTIFICATE OF CORRECTION

PATENT NO. : 4,216,624

DATED : August 12, 1980

INVENTOR(S) : Heinz Blankenburg, Peter Schafer and Friedrich Herrmann

It is certified that error appears in the above-identified patent and that said Letters Patent are hereby corrected as shown below:

Column 7, line 18, after "or" delete 'extraining' and insert --entraining--.

Signed and Sealed this

Third Day of February 1981

[SEAL]

Attest:

RENE D. TEGTMEYER

Attesting Officer — Acting Commissioner of Patents and Trademarks